United States Patent [19]

Heinmeyer et al.

[11] Patent Number: 5,310,854
[45] Date of Patent: May 10, 1994

[54] EPOXY RESIN COMPOSITION AND PROCESS THEREFOR

[75] Inventors: Ben W. Heinmeyer; Pong S. Sheih; David S. Wang, all of Lake Jackson, Tex.

[73] Assignee: The Dow Chemical Company, Midland, Mich.

[21] Appl. No.: 398,034

[22] Filed: Aug. 23, 1989

[51] Int. Cl.$^5$ .................. C08G 59/00; C08F 283/00; B32B 27/38
[52] U.S. Cl. ............................... 528/104; 523/400; 523/456; 525/481; 525/510; 525/523; 428/413; 428/416; 428/418; 264/211.24
[58] Field of Search ............... 528/104; 523/456, 400; 525/523; 264/211.24; 428/413, 416, 418

[56] References Cited

U.S. PATENT DOCUMENTS

| | | | |
|---|---|---|---|
| 2,602,075 | 7/1952 | Carpenter et al. | 528/95 |
| 3,336,257 | 8/1967 | Alvey | 528/93 |
| 3,477,990 | 11/1969 | Dante et al. | 260/47 |
| 3,948,855 | 4/1976 | Perry | 260/47 EP |
| 4,093,650 | 6/1978 | Doorakian et al. | 260/539 A |
| 4,132,706 | 1/1979 | Doorakian et al. | 528/89 |
| 4,171,420 | 10/1979 | Doorakian et al. | 528/89 |
| 4,171,422 | 10/1979 | Lazarus et al. | 528/437 |
| 4,177,216 | 12/1979 | Doorakian et al. | 260/606.5 F |
| 4,192,939 | 3/1980 | Bacskai | 528/313 |
| 4,266,079 | 5/1981 | Doorakian et al. | 568/11 |
| 4,302,574 | 11/1981 | Doorakian et al. | 528/89 |
| 4,340,761 | 7/1982 | Doorakian et al. | 568/11 |
| 4,352,918 | 10/1982 | Whiteside, Jr. et al. | 528/89 |
| 4,354,015 | 10/1982 | Doorakian et al. | 528/89 |
| 4,366,295 | 12/1982 | Tyler, Jr. et al. | 525/482 |
| 4,370,465 | 1/1983 | Whiteside, Jr. et al. | 528/104 |
| 4,395,574 | 7/1983 | Doorakian et al. | 568/11 |
| 4,405,766 | 9/1983 | Bertram et al. | 525/507 |
| 4,410,596 | 10/1983 | Whiteside, Jr. et al. | 428/413 |
| 4,438,254 | 3/1984 | Doorakian et al. | 528/89 |
| 4,477,645 | 10/1984 | Doorakian et al. | 528/99 |
| 4,496,709 | 1/1985 | Doorakian et al. | 528/89 |
| 4,540,823 | 9/1985 | Doorakian et al. | 568/10 |
| 4,596,861 | 6/1986 | Seih et al. | 525/481 |
| 4,612,156 | 9/1986 | Heinemeyer et al. | 264/176 R |
| 4,634,757 | 1/1987 | Marshall | 528/89 |
| 4,692,504 | 9/1987 | Frank | 528/89 |
| 4,725,652 | 2/1988 | Bertram et al. | 525/485 |
| 4,808,692 | 2/1989 | Pham et al. | 528/89 |

FOREIGN PATENT DOCUMENTS

| | | | |
|---|---|---|---|
| 1203943 | 4/1986 | Canada | C08G 59/62 |
| 8400171 | 1/1984 | PCT Int'l Appl. | C08G 59/62 |

OTHER PUBLICATIONS

CA 95:43350t(Pol. 107,627).

*Primary Examiner*—John Kight, III
*Assistant Examiner*—T. Mosley

[57] ABSTRACT

Advanced resin compositions are prepared from a compound having an average of more than one vicinal epoxide group per molecule and an epoxide equivalent weight of from about 170 to about 200 and a compound having an average of more than one aromatic hydroxyl group per molecule wherein the resultant advanced resin has an epoxide or aromatic hydroxyl equivalent weight of from about 200 to about 50,000.

37 Claims, No Drawings

1

EPOXY RESIN COMPOSITION AND PROCESS THEREFOR

FIELD OF THE INVENTION

The present invention concerns advanced epoxy resin compositions, a process for their preparation and coating compositions containing same.

BACKGROUND OF THE INVENTION

Coatings, particularly coatings for the interior of beverage and the like cans have been formulated from advanced epoxy resins. Such coatings prepared from these advanced epoxy resins usually possess good dry adhesion properties, yet the wet adhesion properties are somewhat lacking. For these purposes, the coating of the interior of beverage cans and the like, it is desirable for the coating composition to have both good dry adhesion and wet adhesion properties. U.S. Pat. No. 4,596,861 issued Jun. 24, 1986 to sheih et al. disclosures coating compositions containing advanced epoxy resins which coatings possess good wet adhesion and dry adhesion properties. These coating compositions contain high amounts of solvent. In order to decrease the amount of solvent released to the atmosphere during curing or to decrease the amount of solvent which must be recovered during curing of these coatings, it would be desirable to have available advanced epoxy resins which possess both good wet adhesion and dry adhesion properties and which coating would also be relatively low in solvent content.

Methods exist for the preparation of advanced epoxy resins by the batch process, but because the resultant resins are solid at room temperature, upon completion of the reaction for their preparation they are flaked. However, there are inconsistencies in characteristics between batches due the the necessity of having to maintain the resins at elevated temperatures during this flaking operation thus causing continual reaction during this time.

Heinemeyer et al. in U.S. Pat. No. 4,612,156 issued Sep. 16, 1986 disclose a method for the continuous preparation of advanced epoxy resins by means of an extruder process.

It would be desirable to have available an epoxy resin composition having low solvent content which could be employed in waterborne coating applications which coatings would also possess both good dry adhesion and good wet adhesion properties.

SUMMARY OF THE INVENTION

One aspect of the present invention pertains to an advanced resin composition prepared from a compound having an average of more than one vicinal epoxide group per molecule and an epoxide equivalent weight of from about 170 to about 200 and a compound having an average of more than one aromatic hydroxyl group per molecule wherein the resultant resin has an epoxide or aromatic hydroxyl equivalent weight of from about 200 to about 50,000 and a weight average molecular weight of from about 400 to about 200,000; said advanced resin composition containing from about 0.01 to less than 5 percent by weight of an organic solvent based on the combined weight of advanced resin and organic solvent.

Another aspect of the present invention pertains to a coating composition comprising the above mentioned advanced resin and a curing amount of a suitable curing agent therefor.

Another aspect of the present invention pertains to a substrate coated with the aforementioned coating composition which coating has subsequently been cured.

A further aspect of the present invention pertains to a method for preparing an advanced resin composition containing an organic solvent which process comprises (I) continuously feeding to an extruder operating at a temperature and pressure sufficient to cause a reaction between components (A) and (B) and for a time sufficient to produce the desired product, the following components either separately or in admixture in any combination (A) at least one compound having an average of more than one but not more than about two vicinal epoxide groups per molecule and having an epoxide equivalent weight of from about 170 to about 200;

(B) at least one compound having an average of more than one but not more than about two aromatic hydroxyl groups per molecule;

(C) a catalytic quantity of at least one catalyst for promoting the reaction between components (A) and (B); and (D) at least one organic solvent; and (II) thereafter forming the thus formed resinous material exiting from the extruder to the desired physical form by any suitable means; and wherein (a) components (A) and (B) are employed in quantities such that the resultant advanced resin has an epoxide equivalent weight of from about 200 to about 50,000 and a weight average molecular weight of from about 400 to about 200,000; and (b) component (D) is employed in an amount such that the resultant product contains from about 0.01 to less than 5 percent by weight based upon the combined weight of components (A), (B), (C) and (D).

DETAILED DESCRIPTION OF THE INVENTION

The compositions of the present invention are prepared by reacting an epoxy resin with a dihydric phenol in the proper proportions so as to produce a product having an epoxide or aromatic hydroxyl equivalent weight of from about 200 to about 50,000, preferably from about 500 to about 25,000, more preferably from about 700 to about 10,000 and a weight average molecular weight from about 400 to about 200,000, preferably from about 1,000 to about 100,000, more preferably from about 5,000 to about 90,000. The proper proportion depends upon the particular epoxy resin and dihydric phenol being utilized; however, usually the components are employed in amounts which provide a ratio of aromatic hydroxyl groups to epoxide groups suitably from about 0.01:1 to about 5:1, more suitably from about 0.1:1 to about 2:1, most suitably from about 0.3:1 to about 1.1:1.

The advanced epoxy resin can be terminated in epoxide or hydroxyl groups or both depending upon the ratio of aromatic hydroxyl groups to epoxy group.

The reaction is suitably conducted at temperatures of from about 90° C. to about 280° C., more suitably from about 120° C. to about 250° C., most suitably from about 170° C. to about 250° C. for a time sufficient to produce the desired temperature. The higher reaction temperatures require less time to produce the desired product than do the lower reaction temperatures. Particularly suitable reaction times range between about 0.01 to about 5, more suitably from about 0.01 to about 0.2, most suitably from about 0.01 to about 0.06, hours.

At temperatures above about 280° C., the product forms gels or decomposes. At temperatures below about 90° C., the product solidifies.

Suitable compounds having an average of more than one vicinal epoxy group per molecule which can be employed in the present invention include, for example, the glycidyl esters of compounds having an average of more than one carboxyl group per molecule, the glycidyl ethers of compounds having an average of more than one aromatic hydroxyl group per molecule. Particularly suitable glycidyl ethers include, for example, those represented by the following formulas I or II

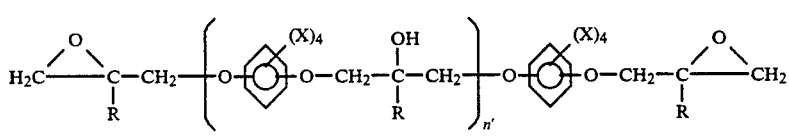

Formula I

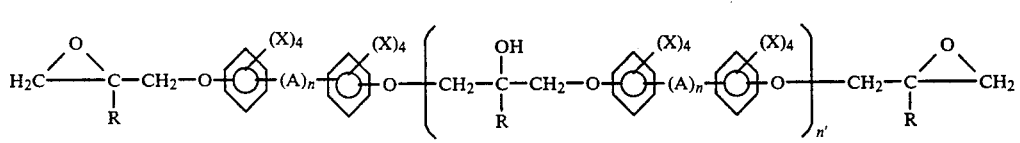

Formula II wherein each A is independently a divalent hydrocarbyl group having suitably from 1 to about 20, more suitably from 1 to about 10, most suitably from 1 to about 6, carbon atoms; each X is independently hydrogen, a hydrocarbyl or hydrocarbyloxy group having suitably from 1 to about 20, more suitably from 1 to about 10, most suitably from 1 to about 6, carbon atoms, a halogen atoms, preferably chlorine or bromine; each n independently has a value of zero or 1 and n' has a value suitably from zero to about 100, more suitably from about 4 to about 50, most suitably from 10 to about 35.

Particularly suitable epoxy-containing compounds include, for example, the diglycidyl ethers of biphenol, bisphenol A, bisphenol F, bisphenol K, bisphenol S, and the halogenated, particularly the brominated derivatives thereof.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. Likewise, the term hydrocarbyloxy means a hydrocarbyl group having an oxygen linkage between it and the carbon atom to which it is attached.

Suitable compounds having an average of more than one aromatic hydroxyl group per molecule include, for example, the bisphenols represented by the following formulas III or IV

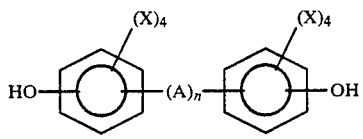

-continued

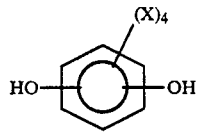

wherein each A, X and n are as defined above.

Particularly suitable aromatic hydroxyl group containing compounds include, for example, biphenol, bisphenol A, bisphenol F, bisphenol K, bisphenol S, and the halogenated, particularly the brominated, derivatives thereof.

Suitable solvents which can be employed in the compositions and process of the present invention include, for example, glycol ethers, alcohols, ketones, acetates, aromatic hydrocarbons, any combination thereof and the like. Particularly suitable solvents include, for example, acetone, methyl ethyl ketone, methyl isobutyl ketone, methyl amyl ketone, diacetone alcohol, methyl ether of dipropylene glycol, 3-methyl-3-methoxy butanol, n-butanol, sec-butanol, isopropanol, butyl acetate, toluene, xylene, any combination thereof and the like.

The solvent(s) is (are) suitably employed in amounts of from about 0.01 to about 5, more suitably from about 0.1 to about 3, most suitably from about 0.5 to about 2, percent by weight based upon combined weight of the composition (components A, B, C and D.

Suitable catalysts which can be employed to prepare the compositions of the present invention include, for example, phosphonium compounds such as, for example, phosphonium carboxylates, phosphonium carboxylate.carboxylic acid complexes, phosphonium halides, phosphonium biscarbonates, phosphonium phosphates, any combination thereof and the like. Particularly suitable such catalysts, include, for example, ethyltriphenylphosphonium acetate.acetic acid complex, ethyltriphenylphosphonium phosphate, tetrabutylphosphonium acetate.acetic acid complex, tetrabutylphosphonium phosphate, any combination thereof and the like.

Also suitable are those catalysts represented by the general formula $$^\ominus Z'R^1R^2R^3P^\oplus{-}Z{-}P^\oplus R^1R^2R^3Z'^\ominus$$

wherein each $R^1$, $R^2$ and $R^3$ is independently an aromatic group or an inertly substituted aromatic group; Z is $-(C(R^4)_2)_a-$; each $R^4$ is independently hydrogen or a hydrocarbyl group or inertly substituted hydrocarbyl group containing from 1 to about 20, more suitably from 1 to about 10, most suitably from 1 to about 4 carbon atoms; Z' is any suitable anion and a has a value of at least 4, suitably from about 4 to about 20, more suitably from about 4 to about 10, most suitably from 4 to about 6. The term hydrocarbyl is as hereinbefore defined. The term inert substituted hydrocarbyl group means that the hydrocarbyl group can contain one or more substituent groups that does not enter into the reaction and does not interfere with the reaction between the epoxy compound and the compound with which it is being reacted. Suitable such inert groups include, for example, —CO—Cl, —C≡N, —OH and the like. Particularly suitable such catalyst include, for example, tetramethylene bis(triphenyl phosphonium chloride), tetramethylene bis(triphenyl phosphonium iodide), tetramethylene bis(triphenyl phosphonium bromide), pentamethylene bis(triphenyl phosphonium chloride), pentamethylene bis(triphenyl phosphonium iodide), pentamethylene bis(triphenyl phosphonium bromide), hexamethylene bis(triphenyl phosphonium iodide), hexamethylene bis(triphenyl phosphonium bromide), heptamethylene bis(triphenyl phosphonium chloride), heptamethylene bis(triphenyl phosphonium iodide), heptamethylene bis(triphenyl phosphonium bromide), tetramethylene bis(triphenyl phosphonium acetate.acetic acid complex), pentamethylene bis(triphenyl phosphonium acetate.acetic acid complex), hexamethylene bis(triphenyl phosphonium acetate.acetic acid complex), heptamethylene bis(triphenyl phosphonium acetate.acetic acid complex), tetramethylene bis(triphenyl phosphonium phosphate), pentamethylene bis(triphenyl phosphonium phosphate), hexamethylene bis(triphenyl phosphonium phosphate), heptamethylene bis(triphenyl phosphonium phosphate), tetramethylene bis(triphenyl phosphonium)bicarbonate, pentamethylene bis(triphenyl phosphonium)bicarbonate, hexamethylene bis(triphenyl phosphonium)bicarbonate, heptamethylene bis(triphenyl phosphonium)bicarbonate, tetramethylene bis(triphenyl phosphonium)oxalate, pentamethylene bis(triphenyl phosphonium)oxalate, hexamethylene bis(triphenyl phosphonium)oxalate heptamethylene bis(triphenyl phosphonium)oxalate, combinations thereof and the like.

Also suitable are phosphonium compounds which have three phenyl groups attached to the phosphorus atom and one cycloalkyl group attached to the phosphorus atom can be employed herein. It does not matter what the anion portion of the phosphonium compound happens to be. Particularly suitable anions include, for example, the halides such as, for example, chloride, bromide or iodide; the carboxylates such as, for example, formate, acetate, oxalate, trifluoroacetate, carboxylate.carboxylic acid complexes such as, for example, acetate.acetic acid complex; conjugate bases of inorganic acids such as, for example, bicarbonate, tetrafluoroborate or biphosphate; and conjugate bases of phenols, such as, for example, phenate or an anion derived from a bisphenol or biphenol such as, for example, bisphenol A or bisphenol F, combinations thereof and the like. These cycloalkyl triphenyl phosphonium catalysts can be represented by the following formula

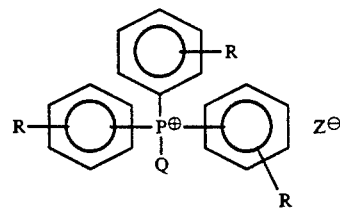

wherein Q is a cycloalkyl or alkyl or halo substituted cycloalkyl group having suitably from about 3 to about 8, more suitably from about 4 to about 7, most suitably from 5 to about 6 carbon atoms in the cycloalkyl ring; each R is independently hydrogen, a halogen, or a hydrocarbyl group having suitably from 1 to about 12, more suitably from 1 to about 6, most suitably from 1 to about 3, carbon atoms; Z is an anion such as, for example, halide such as, for example, chloride, bromide or iodide; carboxylate such as, for example, formate, acetate, oxalate, trifluoroacetate, carboxylate.carboxylic acid complex such as, for example, acetate.acetic acid complex; conjugate base of an inorganic acid such as, for example, bicarbonate, tetrafluoroborate or biphosphate and a conjugate base of a phenol, such as, for example, phenate or an anion derived from a bisphenol or biphenol such as, for example, bisphenol A or bisphenol F, combinations thereof and the like. Particularly suitable such catalysts include, for example, cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium heptanoate, cyclopropyl triphenyl phosphonium oxalate, cyclobutyl triphenyl phosphonium iodide, cyclobutyl triphenyl phosphonium bromide, cyclobutyl triphenyl phosphonium chloride, cyclobutyl triphenyl phosphonium acetate, cyclobutyl triphenyl phosphonium acetate.acetic acid complex, cyclobutyl triphenyl phosphonium phosphate, cyclobutyl triphenyl phosphonium heptanoate, cyclobutyl triphenyl phosphonium oxalate, cyclopentyl triphenyl phosphonium iodide, cyclopentyl triphenyl phosphonium bromide, cyclopentyl triphenyl phosphonium chloride, cyclopentyl triphenyl phosphonium acetate, cyclopentyl triphenyl phosphonium acetate.acetic acid complex, cyclopentyl triphenyl phosphonium phosphate, cyclopentyl triphenyl phosphonium heptanoate, cyclopentyl triphenyl phosphonium oxalate, cyclopropyl triphenyl phosphonium iodide, cyclopropyl triphenyl phosphonium bromide, cyclopropyl triphenyl phosphonium chloride, cyclopropyl triphenyl phosphonium acetate, cyclopropyl triphenyl phosphonium acetate.acetic acid complex, cyclopropyl triphenyl phosphonium phosphate, cyclopropyl triphenyl phosphonium heptanoate, cyclopropyl triphenyl phosphonium oxalate, cyclohexyl triphenyl phosphonium iodide, cyclohexyl triphenyl phosphonium bromide, cyclohexyl triphenyl phosphonium chloride, cyclohexyl triphenyl phosphonium acetate, cyclohexyl triphenyl phosphonium acetate.acetic acid complex, cyclohexyl triphenyl phosphonium phosphate, cyclohexyl triphenyl phosphonium oxalate, cycloheptyl triphenyl phosphonium iodide, cycloheptyl triphenyl phosphonium bromide, cycloheptyl triphenyl phosphonium chloride, cycloheptyl triphenyl phosphonium acetate, cycloheptyl triphenyl phosphonium acetate.acetic acid complex, cycloheptyl triphenyl phosphonium phosphate, cycloheptyl triphenyl phosphonium heptanoate, cycloheptyl triphenyl phosphonium oxalate, cyclooctyl triphenyl phosphonium iodide, cyclooctyl triphenyl phosphonium bromide, cyclooctyl triphenyl phosphonium chloride, cyclooctyl triphenyl phosphonium acetate, cyclooctyl triphenyl phosphonium acetate.acetic acid complex, cyclooctyl triphenyl phosphonium phosphate, cyclooctyl triphenyl phosphonium heptanoate, cyclooctyl triphenyl phosphonium oxalate, combinations thereof and the like., any combination thereof and the like.

The catalyst is employed in any amount which satisfactorily catalyzes the reaction between the bisphenol and the epoxy resin; however suitable such amounts include from about 0.01 to about 3, more suitably from about 0.03 to about 2, most suitably from about 0.04 to about 1, weight percent of catalyst based on the combined weight of the reactants.

The advanced resins are preferably prepared via an extruder process as described by Heinemeyer et al. in U.S. Pat. No. 4,612,156 which is incorporated herein in its entirety by reference.

Suitable curing agents which can be employed in the coating compositions of the present invention include, for example, phenol-aldehyde resole resins, urea-aldehyde resins, melamine-aldehyde resins, polyamides, acid anhydrides, primary, secondary and tertiary amines, imidazoles, guanadines, any combination thereof and the like. Particularly suitable curing agents include, for example, melamine-formaldehyde resins, phenol-formaldehyde resole resins, urea-formaldehyde resins, polyamides, any combination thereof and the like.

The curing agents are employed in amounts which are sufficient to satisfactorily cure the composition. Usually suitable amounts include from about 1 to about 50, more suitably from about 5 to about 30, most suitably from about 10 to about 25, moles of curing agent per epoxide group is sufficient to cure the composition.

The advanced epoxy resins produced by the process of the present invention can be formed upon exiting from the extruder by any suitable means, such as for example, chopping into pellets, flaking, grinding, forming into sheets or pastilles or films, or any combination thereof and the like.

The coating compositions of the present invention can contain, in addition to the advanced epoxy resin, solvent and curing agents, fillers, pigments, dyes, flow control agents, leveling agents, antioxidants, and the like.

These additional additives are employed in functionally equivalent amounts, i.e. that is the amount which is suitable to produce the desired effect.

The coating compositions of the present invention can be applied to such substrates as tin, steel, aluminum, wood, plastic, paper, and the like.

The following examples are illustrative of the invention, but are not to be construed as to limiting the scope thereof in any manner.

EXTRUDER DESCRIPTION

The extruder-reactor used in the following examples is a Werner-Pfleiderer ZSK-30 fully intermeshing, co-rotating twin screw extruder. The extruder barrel is 1140 millimeters in length excluding the die. The extruder barrel has an internal diameter of 30 millimeters making the length to diameter ratio 38/1. The barrel consists of 12 barrel sections and two guide plates. In the 12 sections, there is a feed section; three sections that could be used as vacuum or vent ports, injection ports or plugged to become solid sections, and eight solid sections. The barrel configuration used for this process is a feed port section, vent port section, one solid section, guide plate, seven solid sections, two plugged vent port sections, guide plate, and die section. There are four intensive mixing sections designed into the screws which are 1154 millimeters long excluding the screw tips. It should be noted that the screws extend into the die section of the barrel. The barrel is divided into six heating and cooling zones excluding the feed port section which is individually cooled. The sixth zone includes the die section of the barrel. The zones are electrically heated and water cooled. A temperature controller is used to control the barrel temperature of each zone. The melt temperature is measured in the sixth barrel section and at the die.

WET and DRY ADHESION

The coatings are tested for wet and dry adhesion using the T-peel test ASTM D 1876 (1978). The wet adhesion test is performed after the test panel has been immersed in 90° C. water for four days.

COMPARATIVE EXPERIMENT A

1. Preparation of advanced epoxy resin in the absence of solvent.

Diglycidyl ether of bisphenol A having an epoxide equivalent weight (EEW) of 189.18 and p,p'-bisphenol A are fed to the extruder in an equivalent ratio of epoxide groups to phenolic hydroxyl groups of 1.0308:1.00. The materials are added simultaneously to the feed port section. The materials are fed together in the fed port and 1 milliequivalent of ethyl triphenyl phosphonium acetate.acetic acid complex catalyst per equivalent of bisphenol A is separately added to the feed port. The catalyst is employed as a 70% solution in methanol. The charge to the extruder is as follows:

epoxy resin: 12.55 lbs per hour, 0.0663 lb. eqiv. (5.70 kg/hr, 30.13 g equiv.);
bisphenol A: 7.33 lbs per hour, 0.0643 lb. equiv. (3.33 kg/hr, 29.23 g equiv.);
active catalyst: 28.9 grams per hour, 0.000155 lb. equiv. (0.071 g equiv.).

The liquid epoxy resin is fed from a vessel heated to 65° C. The melt temperature is controlled at 65° C. to facilitate pumping. The bisphenol A is fed from a melt reservoir which is controlled at 170° C. The two raw materials are fed to the feed port section of the extruder (see extruder description). Catalyst is fed separately to the feed port section or admixed with the liquid resin just prior to the extruder feed port. The various heat zones are controlled to keep the melt below 200° C. and the feed rate and screw speed are controlled to give an average residence time in the extruder of 2.5 to 3.5 minutes. The material is collected in thin sheets, cooled in air, and crushed into a powder. A solution is prepared by mixing this advanced epoxy resin with a proprietary organic solvent mixture such that the resultant solution contains 30 parts by weight (pbw) of advanced resin and 70 pbw of the organic solvent mixture.

2. Preparation of Coating Composition.

A coating is prepared by mixing the following components:

30 pbw of the advanced resin prepared in Comparative Experiment A.
70 pbw of a proprietary organic solvent composition.

The above mixture is heated for 4 hours at a temperature of 110° C. After cooling to ambient temperature, the resultant coating composition is applied to tin-free steel panels and cured in an oven at 210° C. for 15 minutes. The thus coated panel is then cut into 5 mm wide strips and between each pair of strips is placed 0.08 mm thick Nylon-12 tape. Each pair of strips is then heat bonded under a pressure of 150 psig (1,034.22 kPa) at a temperature of about 205° C. for 0.5 minute. The panels are then tested for wet and dry adhesion. The results are given in Table I.

COMPARATIVE EXPERIMENT B

1. Description of commercially available epoxy resin.

Epikote 1009 (Shell Chemical Company) resin, a diglycidyl ether of bisphenol A having an EEW of 2,700 and 17,000 weight average molecular weight is evaluated.

A solution is prepared by mixing this epoxy resin with a proprietary organic solvent mixture such that the resultant solution contains 30 pbw of epoxy resin and 70 pbw of the organic solvent mixture.

2. Preparation of Coating Composition.

A coating is prepared as described in Comparative Experiment A-2. The properties of the coating prepared from the commercial epoxy resin produced of Comparative Experiment B are given in Table I.

COMPARATIVE EXPERIMENT C

1. Description of commercially available epoxy resin.

A Dow Chemical Company resin, a diglycidyl ether of bisphenol A prepared by a solution process (see U.S. Pat. No. 4,596,861 which is incorporated herein by reference) and designated as SD669MS40 is evaluated. This epoxy resin contains 40 percent epoxy resin by weight and 60 percent organic solvent by weight.

A solution is prepared by mixing this epoxy resin with a proprietary organic solvent mixture such that the resultant solution contains 30 pbw of epoxy resin and 70 pbw of the organic solvent mixture.

2. Preparation of Coating Composition.

A coating is prepared as described in Comparative Experiment A-2. The properties of the coating prepared from the commerical epoxy resin of Comparative Experiment C are given in Table I.

EXAMPLE 1

A. Preparation of advanced epoxy resin in the presence of 1 weight percent of solvent.

Diglycidyl ether of bisphenol A having an EEW of 187.9 and p,p-bisphenol A are fed to the extruder in a molar ratio of epoxy resin to bisphenol A of 1.0805:1.0000. The procedure used in Comparative Experiment A is followed in this example. The materials are fed together in the feed port and 55.32 milliequivalent/hr of ethyl triphenyl phosphonium acetate.acetic acid complex catalyst per equivalent of bisphenol A and 90.72 g/hr ethylene glycol n-butyl ether solvent are separately added to the feed port. The catalyst is employed as a 70% solution in methanol and ethylene glycol n-butyl ether solvent is added to the catalyst solution so as to yield the desired level in the final epoxy resin product. The catalyst solution is prepared by adding 90.72 g ethylene glycol n-butyl ether to 32.40 g of 70% ethyl triphenyl phosphonium acetate.acetic acid complex in methanol to yield 1.0% ethylene glycol n-butyl ether in the final product. The charge to the extruder is as follows:

epoxy resin: 12.81 lbs per hour, 0.068 lb. equiv. (5.82 kg/hr, 30.98 g equiv.);

bisphenol A: 7.19 lbs per hour, 0.631 lb. equiv. (3.268 kg/hr, 28.67 g equiv.);

active catalyst: 22.68 grams per hour, 0.0001219 lb. equiv. (0.0553 g equiv.); and solvent: 90.72 grams per hour, 0.00169 lb. equiv. (0.768 g equiv.).

A solution is prepared by mixing this advanced epoxy resin with a proprietary organic solvent mixture such that the resultant solution contains 30 parts by weight (pbw) of advanced resin and 70 pbw of the organic solvent mixture.

B. Preparation of Coating Composition.

A coating is prepared as described in Comparative Experiment A-2. The properties of the coating prepared from the advanced epoxy resin produced in Example 1 are given in Table I.

EXAMPLE 2

A. Preparation of advanced epoxy resin in the presence of 0.5 weight percent of solvent.

Diglycidyl ether of bisphenol A having an EEW of 188.1 and p,p-bisphenol A are fed to the extruder in a molar ratio of epoxy resin to bisphenol A of 1.081:1.000. The procedure used in Comparative Experiment A is followed in this example. The catalyst solution in this example is the same as in Example 2 except that the ethylene glycol n-butyl ether level is 0.5% instead of 1.0%. The charge to the extruder is as follows:

epoxy resin: 12.815 lbs per hour, 0.068 lb. equiv. (5.825 kg/hr, 30.97 g equiv.);

bisphenol A: 7.185 lbs per hour, 0.063 lb. equiv. (3.266 kg/hr, 28.65 g equiv.);

active catalyst: 8.16 grams per hour, 0.000044 lb. equiv. (0.0199 g equiv.); and solvent: 45.36 grams per hour, 0.0008 lb. equiv. (0.384 g equiv.).

B. Preparation of Coating Composition.

A coating is prepared as described in Comparative Experiment A-2. The properties of the coating prepared from the advanced epoxy resin produced in Example 2 are given in Table I.

EXAMPLE 3

A. Preparation of advanced epoxy resin in the presence of 3 weight percent of solvent.

Diglycidyl ether of bisphenol A having an EEW of 188.1 and p,p-bisphenol A are fed to the extruder in a molar ratio of epoxy resin to bisphenol A of 1.081:1.000. The procedure used in Comparative Experiment A is followed in this example. The catalyst solution in this example is the same as in Example 1 except that the ethylene glycol n-butyl ether (solvent) level is 3.0% instead of 1.0%. The charge to the extruder is as follows:

epoxy resin: 12.815 lbs per hour, 0.068 lb. equiv. (5.825 kg/hr, 30.97 g equiv.);

bisphenol A: 7.185 lbs per hour, 0.063 lb equiv. (3.266 kg/hr, 28.65 g equiv.);

catalyst solution: 13.608 grams per hour, 0.000073 lb. equiv. (0.033 g equiv.); and solvent: 272.16 grams per hour, 0.0051 lb equiv. (2.303 g equiv.).

B. Preparation of Coating Composition.

A coating is prepared as described in Comparative Experiment A-2. The properties of the coating prepared from the advanced epoxy resin produced in Example 3 are given in Table I.

EXAMPLE 4

A. Preparation of advanced epoxy resin in the presence of 4.5 weight percent of solvent.

Diglycidyl ether of bisphenol A having an EEW of 188.1 and p,p-bisphenol A are fed to the extruder in a molar ration of epoxy resin to bisphenol A of 1.0829:1.0000. The procedure used in Comparative Experiment A is followed in this example. The catalyst solution in this example is the same as in Example 2 except that the ethylene glycol n-butyl ether (solvent) level is 4.5% instead of 1.0%. The charge to the extruder is as follows:

- epoxy resin: 12.826 lbs per hour, 0.068 lb. equiv. (5.83 kg/hr, 30.929 g equiv.);
- bisphenol A: 7.179 lbs per hour, 0.0630 lb. equiv. (3.263 kg/hr, 28.56 g equiv.);
- catalyst solution: 13.608 grams per hour, 0.000073 lb. equiv. (0.033 g equiv.); and
- solvent: 408.24 grams per hour, 0.00755 lb. equiv. (3.45 g equiv.).

B. Preparation of Coating Composition.

A coating is prepared as described in Comparative Experiment A-2. The properties of the coating prepared from the advanced epoxy resin produced in Example 4 are given in Table I.

TABLE I

| EXAMPLE OR COMPARATIVE EXPERIMENT | ORGANIC SOLVENT (%) | EEW | Mw | ADHESION | | | |
|---|---|---|---|---|---|---|---|
| | | | | DRY | | WET | |
| | | | | lbs/5 mm | kg/5 mm | lbs/5 mm | kg/5 mm |
| Example 1 | 1.0 | 3,630 | 15,380 | 15.0 | 6.8 | 8.8 | 4.2 |
| Example 2 | 0.5 | 3,760 | 16,030 | 15.4 | 7.0 | 8.1 | 3.9 |
| Example 3 | 3.0 | 3,695 | 15,410 | 15.0 | 6.8 | 8.8 | 4.2 |
| Example 4 | 4.5 | 3,697 | 14,840 | 13.2 | 6.0 | 10.1 | 4.6 |
| Comparative Experiment A* | 0.0 | 3,440 | 15,750 | 15.4 | 7.0 | 7.3 | 3.3 |
| Comparative Experiment B* | 0.0 | 2,700 | 17,000 | 15.4 | 7.0 | 6.6 | 3.0 |
| Comparative Experiment C* | — | 3,550 | 15,800 | 15.0 | 6.8 | 8.1 | 3.9 |

*Not an example of the present invention.

What is claimed is:

1. An advanced resin composition prepared from a compound having an average of more than one vicinal epoxide group per molecule and an epoxide equivalent weight of from about 170 to about 200 and a compound having an average of more than one aromatic hydroxyl group per molecule wherein the resultant advanced resin has an epoxide or aromatic hydroxyl equivalent weight of from about 200 to about 50,000 and a weight average molecular weight of from about 400 to about 200,000; said advanced epoxy resin composition containing from about 0.01 to about 3 percent by weight of an organic solvent based on the combined weight of advanced epoxy resin and organic solvent.

2. An advanced resin composition of claim 1 wherein the resultant epoxy resin has an epoxide or aromatic hydroxyl equivalent weight of from about 500 to about 25,000 and a weight average molecular weight of from about 1,000 to about 100,000; based on the combined weight of advanced epoxy resin and organic solvent.

3. An advanced resin composition of claim 1 wherein the resultant epoxy resin has an epoxide equivalent weight of from about 700 to about 10,000 and a weight average molecular weight of from about 5,000 to about 90,000; said advanced epoxy resin composition containing from about 0.5 to about 2 percent by weight of an organic solvent based on the combined weight of advanced epoxy resin and organic solvent.

4. An advanced resin composition of claim 1, 2 or 3 wherein said advanced epoxy resin results from reacting a compound having an average of more than one, but not more than about two vicinal epoxide groups per molecule with a compound having an average of more than one, but not more than about two aromatic hydroxyl groups per molecule in amounts which provide a ratio of aromatic hydroxyl groups per epoxide group of from about 0.01:1 to about 5:1; and wherein said organic solvent is a glycol ether, alcohol, ketone, acetate, aromatic hydrocarbon or any combination thereof.

5. An advanced resin composition of claim 4 wherein said compound having an average of more than one, but not more than about two vicinal epoxide groups per molecule is a diglycidyl ether of bisphenol A, bisphenol F, bisphenol K, bisphenol S or a diglycidyl ether of any of such bisphenols substituted with one or more substituents selected from bromine or lower alkyl group, or any combination thereof; and said compound having an average of more than one, but not more than about two aromatic hydroxyl groups per molecule is bisphenol A, bisphenol F, bisphenol K, bisphenol S or any of such bisphenols substituted with a substituent group selected from bromine or lower alkyl group, or any combination thereof; and wherein said organic solvent is acetone, methyl ethyl ketone, methyl isobutyl ketone, methyl amyl ketone, diacetone alcohol, methyl ether of dipropylene glycol, 3-methyl-3-methoxy butanol, n-butanol, sec-butanol, isopropanol, butyl acetate, toluene, xylene, or any combination thereof.

6. A coating composition comprising an advanced resin of claim 1, 2 or 3 and a curing amount of a suitable curing agent therefor.

7. A coating composition of claim 6 wherein said curing agent is a phenol-aldehyde resole resin, a urea-aldehyde resin, a melamine-aldehyde resin, a polyamide, an acid anhydride, a primary amine, a secondary amine or a tertiary amine, an imidazole, a guanadine, or any combination thereof.

8. A coating composition of claim 7 wherein said curing agent is a melamine-formaldehyde resin, a phenol-formaldehyde resole resin, a urea-formaldehyde resin, a polyamide, or any combination thereof.

9. A coating composition comprising an advanced epoxy resin of claim 4 and a curing amount of a suitable curing agent therefor.

10. A coating composition of claim 9 wherein said curing agent is a phenol-aldehyde resole resin, a urea-aldehyde resin, a melamine-aldehyde resin, a polyamide, an acid anhydride, a primary amine, a secondary amine or a tertiary amine, an imidazole, a guanadine, or any combination thereof.

11. A coating composition of claim 10 wherein said curing agent is a melamine-formaldehyde resin, a phenol-formaldehyde resole resin, a urea-formaldehyde resin, a polyamide, or any combination thereof.

12. A coating composition comprising an advanced epoxy resin of claim 5 and a curing amount of a suitable curing agent therefor.

13. A coating composition of claim 12 wherein said curing agent is a phenol-aldehyde resole resin, a urea-aldehyde resin, a melamine-aldehyde resin, a polyamide, an acid anhydride, a primary amine, a secondary amine or a tertiary amine, an imidazole, a guanadine, or any combination thereof.

14. A coating composition of claim 13 wherein said curing agent is a melamine-formaldehyde resin, a phenol-formaldehyde resole resin, a urea-formaldehyde resin, a polyamide, or any combination thereof.

15. A process for preparing an advanced resin composition containing an organic solvent which process comprises
   (I) continuously feeding to an extruder operating at a temperature and pressure sufficient to cause a reaction between components (A) and (B) and for a time sufficient to produce the desired product, the following components either separately or in admixture in any combination
      (A) at least one compound having an average of more than one but not more than about two vicinal epoxide groups per molecule and having an epoxide equivalent weight of from about 170 to about 200;
      (B) at least one compound having an average of more than one but not more than about two aromatic hydroxyl groups per molecule;
      (C) a catalytic quantity of at least one catalyst for promoting the reaction between components (A) and (B); and
      (D) at least one organic solvent; and
   (II) thereafter forming the thus formed resinous material exiting from the extruder to the desired physical form by any suitable means; and wherein
      (a) components (A) and (B) are employed in quantities such that the resultant advanced resin has an epoxide equivalent weight of from about 200 to about 50,000 and a weight average molecular weight of from about 400 to about 200,000; and
      (b) component (D) is employed in an amount such that the resultant product contains from about 0.01 to percent by weight based upon the combined weight of components (A), (B), (C) and (D).

16. A process of claim 15 wherein the resultant advanced resin has an epoxide equivalent weight of from about 500 to about 25,000 and a weight average molecular weight of from about 1,000 to about 100,000;

17. A process of claim 15 wherein the resultant advanced resin has an epoxide equivalent weight of from about 700 to about 10,000 and a weight average molecular weight of from about 5,000 to about 90,000; said advanced epoxy resin composition containing from about 0.5 to about 2 percent by weight of an organic solvent based on the combined weight of advanced epoxy resin and organic solvent.

18. A process of claim 15, 16 or 17 wherein said advanced resin results from reacting a compound having an average of more than one, but not more than about two vicinal epoxide groups per molecule with a compound having an average of more than one, but not more than about two aromatic hydroxyl groups per molecule in amounts which provide a ratio of aromatic hydroxyl groups per epoxide group of from about 0.01:1 to about 5:1; and wherein said organic solvent is a glycol ether, alcohol, ketone, acetate, aromatic hydrocarbon or any combination thereof.

19. A process of claim 18 wherein said compound having an average of more than one, but not more than about two vicinal epoxide groups per molecule is a diglycidyl ether of bisphenol A, bisphenol F, bisphenol K, bisphenol S or a diglycidyl ether of any of such bisphenols substituted with one or more substituents selected from bromine or lower alkyl group, or any combination thereof; and said compound having an average of more than one, but not more than about two aromatic hydroxyl groups per molecule is bisphenol A, bisphenol F, bisphenol K, bisphenol S or any of such bisphenols substituted with one or more substituents selected from bromine or lower alkyl group, or any combination thereof; and wherein said organic solvent is acetone, methyl ethyl ketone, methyl isobutyl ketone, methyl amyl ketone, diacetone alcohol, methyl ether of dipropylene glycol, 3-methyl-3-methoxy butanol, n-butanol, sec-butanol, isopropanol, butyl acetate, toluene, xylene, or any combination thereof.

20. A substrate which has been coated with a coating composition of claim 6 which coating has subsequently been cured.

21. A coated substrate of claim 20 wherein said substrate is tin or steel.

22. A substrate which has been coated with a coating composition of claim 7 which coating has subsequently been cured.

23. A coated substrate of claim 22 wherein said substrate is tin or steel.

24. A substrate which has been coated with a coating composition of claim 8 which coating has subsequently been cured.

25. A coated substrate of claim 24 wherein said substrate is tin or steel.

26. A substrate which has been coated with a coating composition of claim 9 which coating has subsequently been cured.

27. A coated substrate of claim 26 wherein said substrate is tin or steel.

28. A substrate which has been coated with a coating composition of claim 10 which coating has subsequently been cured.

29. A coated substrate of claim 28 wherein said substrate is tin or steel.

30. A substrate which has been coated with a coating composition of claim 11 which coating has subsequently been cured.

31. A coated substrate of claim 30 wherein said substrate is tin or steel.

32. A substrate which has been coated with a coating composition of claim 12 which coating has subsequently been cured.

33. A coated substrate of claim 32 wherein said substrate is tin or steel.

34. A substrate which has been coated with a coating composition of claim 13 which coating has subsequently been cured.

35. A coated substrate of claim 34 wherein said substrate is tin or steel.

36. A substrate which has been coated with a coating composition of claim 14 which coating has subsequently been cured.

37. A coated substrate of claim 36 wherein said substrate is tin or steel.

* * * * *

UNITED STATES PATENT AND TRADEMARK OFFICE
CERTIFICATE OF CORRECTION

PATENT NO. : 5,310,854
DATED : May 10, 1994
INVENTOR(S) : Ben W. Heinmeyer et al.

It is certified that error appears in the above-identified patent and that said Letters Patent is hereby corrected as shown below:

On the cover page, under "References Cited , U.S. PATENT DOCUMENTS" insert
-- 3,824,212 7/1974 Sinnema et al.--.

On the cover page, under "OTHER PUBLICATIONS", insert
--Derwent Abstract FR2131981-A, Derwent Abstract FR2168301-A, Derwent Abstract EP193809-B--.

In claim 1, column 11, line 55, delete "about 3" and insert --less than 5--.

In claim 2, column 11, line 62, after "100,000;" insert --said advanced epoxy resin containing from about 0.1 to about 3 percent by weight of an organic solvent--.

In claim 15, column 13, line 50, after "0.01 to" insert --less than 5--.

In claim 16, column 13, line 56, after "100,000;" insert --said advanced epoxy resin containing from about 0.1 to about 3 percent by weight of an organic solvent based on the combined weight of advanced epoxy resin and organic solvent.--.

Signed and Sealed this

Fourteenth Day of February, 1995

Attest:

BRUCE LEHMAN

*Attesting Officer*   *Commissioner of Patents and Trademarks*